Figure 1:
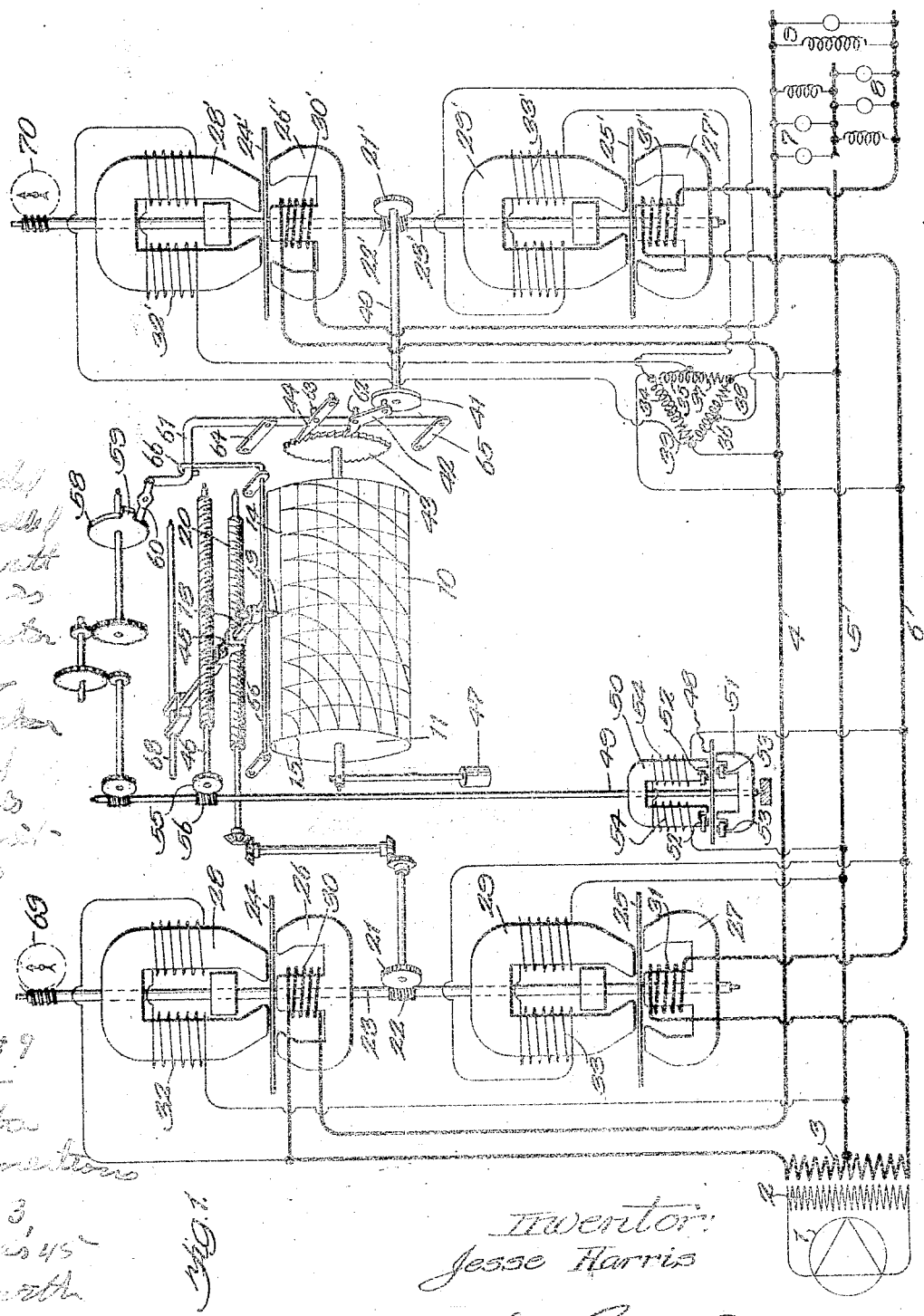

Aug. 25, 1925.　　　　J. HARRIS　　　　1,550,804
ELECTRICITY METER
Filed May 15, 1922　　　2 Sheets-Sheet 2
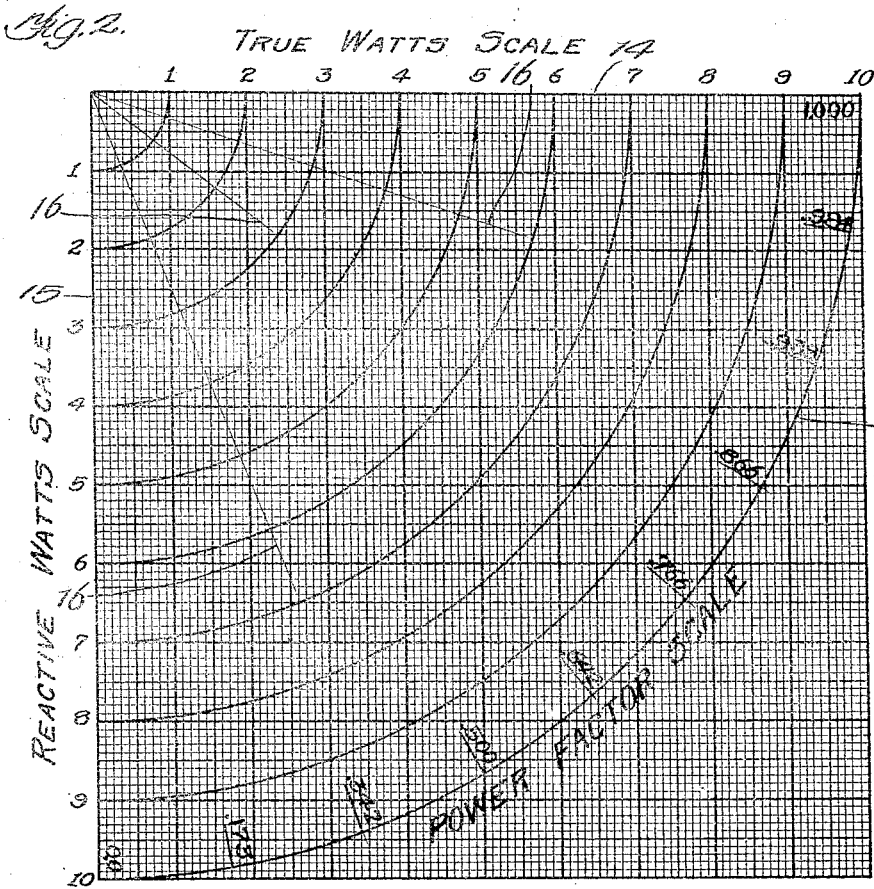
Fig. 2.
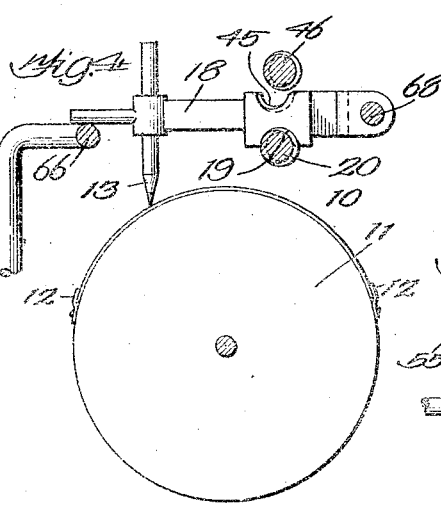
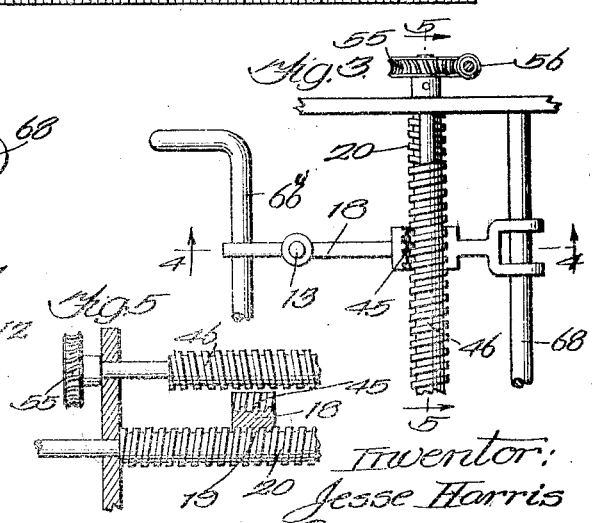
Inventor:
Jesse Harris Patented Aug. 25, 1925.

1,550,804

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

ELECTRICITY METER.

Application filed May 15, 1922. Serial No. 561,141.

*To all whom it may concern:*

Be it known that I, JESSE HARRIS, citizen of the United States, residing at La Fayette, in the county of Tippecanoe and State of Indiana, have invented a certain new and useful Improvement in Electricity Meters, of which the following is a full, clear, concise, and exact description.

My invention relates to electricity meters designed for use upon systems of alternating electric current distribution that have reactive loads, the invention having for its object the provision of an instrument which will record the volt amperes used in such a system. In carrying out my invention means are also preferably afforded for recording the true watts, the reactive watts and the power factor.

The instrument of my invention includes an electric motor having windings subject to current and pressure of the system and arranged to cause motion proportional to the energy consumed, a second electric motor having windings subject to current and pressure of the system and arranged to cause motion proportional to the reactive watts, and a recording instrument having two complemental moving elements, one operated by one motor and the other by the other motor.

In the preferred embodiment of the invention one of these recording instrument elements is in the form of a chart provided with a true watt scale, a reactive watts scale angular to the true watts scale, these scales having a substantially common zero point. A power factor scale is also added to the chart, this third scale being between the other two scales. The other recording instrument element is preferably in the form of a stylus adapted to effect markings upon the chart which conform to the relative movements of the recording instrument elements that are effected by the motors to which they are individual. The chart is preferably of cylindrical curvature and is rotatively mounted to be turned by its motor from zero position in one direction substantially parallel with one of the first two scales. The stylus is reciprocable in a direction substantially parallel with one or the other of the first two scales and is moved by its motor in one direction from zero position, these two scales having a substantially common zero point.

It is desirable to produce a volt ampere record, say once each fifteen minutes, on which account it is necessary to restore the moving elements of the recording instrument to zero positions at the beginning of each period of time. I employ two coupling devices respectively individual to the two motors for coupling the recording instrument elements therewith in order that a record may be produced which will measure the volt amperes during each time period. When the end of each time period has been reached restoring devices that are respectively individual to the recording instrument elements restore these elements to zero position. A restoring motor, such as a constant speed motor furnished with operating current for the system, is effective, at the conclusion of each period, to operate the coupling devices to uncouple the first two motors and for bringing the restoring devices into action.

I will explain my invention more fully by reference to the accompanying drawings in which Fig. 1 is a general diagrammatic view of a polyphase system of distribution having the meter of my invention connected therewith; Fig. 2 represents one form of chart; Fig. 3 is a plan view of a part of the stylus control mechanism; Fig. 4 is a sectional view on the line 4—4 of Fig. 3 with the recording drum added; and Fig. 5 is a section view on line 5—5 of Fig. 3.

Like parts are indicated by similar characters of reference throughout the different figures.

The system of alternating electric current distribution illustrated is a three phase generator 1 in circuit with the primary winding 2 of a transformer whose secondary 3 supplies current to the mains 4, 5 and 6 of the distributing circuit. A load 7 of one phase is included between the mains 4 and 5. A load 8 of another phase is included between the mains 5 and 6 and a load 9 of the third phase is included between the mains 4 and 6. Some of the load is indicated as being reactive, the reactance indicated being electro-magnetic or inductive although it is understood that the reactance may also be electrostatic.

The true watts, the reactive watts, the power factor and the volt amperes are preferably recorded upon a chart 10 mounted upon the cylindrical drum 11 but desirably extending only partially about the same, the chart thus having cylindrical curvature imparted to it. It may be held in place by means of clips 12 so that it may be readily replaced by a fresh chart, say once a month. The element 10 of the recording instrument has a suitable complement such as the stylus 13, the elements 10 and 13 thus constituting parts of a marking instrument which is the preferred form of recording instrument. During each time interval one of these marking instrument elements is moved proportional to the true watts and the other proportional to the reactive watts, as will more fully appear hereinafter. As illustrated, the stylus 13 moves parallel with the true watts scale 14 that extends lengthwise of the drum 11 while the drum itself turns in a plane which is parallel with the reactive watts scale 15, these two movements being at right angles to each other. The scales meet at the left of the drum in a common zero point. The chart may be a small sheet of coordinate paper marked into suitable equal major squares defined by the lines numbered upon the two scales from 1 to 10 inclusive. The major squares are divided into one hundred minor squares by other lines, as is well understood. The joint action of the complemental marking instrument elements 10 and 13 during any one metering period, assuming that the load has a reactive component, will result in an oblique line 16. The sloping of this line is so controlled by the reactive watts and true watts motors that move these elements 10 and 13 respectively, that such oblique line will be proportional in length to the volt amperes, preferably read in KVA terms, employed during the metering period in which the line is being drawn. Such lines produced in different metering periods will be non-coincident if the character of the load changes. If the load does not change in its character the lines for the different periods will be superimposed, the markings varying in length if the load varies in amount or is variable in duration. The true watts employed in each metering period are defined upon the true watts scale 14 by the chart line or space perpendicular to this scale which is reached by the line 16 drawn during such period. Similarly, the reactive watts employed during such period are determined by the line or space that is perpendicular to the reactive watts scale 15 and which is reached by the same line 16 that determines the true watts. If there is no reactive component the drum 11 will not be turned and there would be but one measurement, that of the true watts effected by the movement of the stylus 13.

The power factor scale 17 is desirably a curved line drawn with the common zero point of the other two scales as a center, this line being divided into, say, nine equal parts with power factor values noted at the division points of this curved line, these power factor values being determined by the relation of the division points of the line 17 to the true watts scale 14, as the chart is arranged. The power factor in any one metering period is determined by radially continuing the volt ampere line 16 formed during such period, or the median of such line if it be irregular, until it intersects the line 17, the point of intersection determining the power factor value for the corresponding metering period. If this point of intersection does not happen to be coincident with one of the markings of the scale 17, the power factor value measured by such point of intersection may readily be calculated with reference to the power factor notations upon either side thereof.

As is understood, the stylus 13 may be moved proportionally to the true watts or the reactive watts and the chart 10 may be moved proportionally to the reactive watts or the true watts as is preferred. As stated, in the preferred embodiment of the invention illustrated, the stylus 13 is moved proportionally to the watts and to this end is mounted upon a carrier 18 formed with a worm thread 19 that is adapted to mesh with a worm shaft 20 when the stylus is moved in a metering direction away from the zero point of the scale 14. This worm shaft is preferably provided with gearing, including the worm pinion 21 which is in mesh with a worm 22 upon the spindle 23 of the motor element of a polyphase meter. This spindle carries two aluminum or other non-magnetic metallic discs 24 and 25. E-shaped cores 26 and 27 are respectively placed in inductive relation to the disc as are U-shaped cores 28 and 29. The cores 26 and 27 are respectively provided with current windings 30 and 31 respectively included in the mains 4 and 6. The cores 28 and 29 are respectively provided with pressure windings 32 and 33, the winding 32 being in bridge of the mains 4 and 5 while the winding 33 is in bridge of the mains 5 and 6.

The described motor element which drives the worm shaft 20 is one of many types of motor elements employed in polyphase watt meters as is well understood by those skilled in the art. By means of this polyphase meter motor and the gearing between it and the stylus 13 such stylus is moved along the scale 14 proportionally to the watts.

The motor for turning the drum proportionally to the reactive watts is generally similar to the true watts motor that operates the stylus 13, the parts of the reactive watts motor that are similar to parts of the true watts motor having similar reference characters applied thereto with added prime exponent marks. The current windings 30', 31' are included respectively in the mains 4 and 6. The pressure windings 32', 33' are, however, included in circuit between the mains through the intermediation of an auto-transformer device comprising transformer coils 34, 35 and 36 connected with resistance coils 37, 38 and 39. The reactive watts motor performs its function through gearing 21' in mesh with the worm 22' upon the shaft 23'. The gearing 21' drives a shaft 40 carrying a crank disc 41 upon which is pivoted a driving pawl 42. This pawl engages a ratchet wheel 43 carried by the drum 11. The shaft 40, once in each revolution, serves to turn the ratchet wheel 43 one tooth space. A holding dog 44 prevents return movement of said wheel.

At the conclusion of each metering period, say each quarter of an hour, the worm 19 upon the lower side of the stylus holder 18 is lifted from the worm shaft 20 and the worm 45, also formed in the stylus holder 18, is brought into mesh with the constantly rotating restoring shaft 46 to return the stylus 13 to zero position. At the same time the pawl 42 and the dog 44 are disengaged from the ratchet wheel 43 to permit the weighted arm 47 (turning with the drum 11 and raised from its lowermost position when the drum is moved from zero position) to restore the drum to zero position. The coupling devices 19, 20 and 42, 43 are thus respectively individual to the true watts motor and the reactive watts motor as are also the restoring devices 45, 46 and 47. The mechanism for releasing the coupling devices and bringing the restoring devices into action desirably includes a constant speed electric motor, the motor shown including a non-magnetic closed circuit metallic armature 48 upon a spindle 49 and located between electromagnetic cores 50 and 51 having shaded poles 52 and 53. The core 50 is further provided with a winding 54 subject to pressure of the system by being connected in bridge of two of the mains such as 5 and 6.

The restoring devices are operated by means of gearing 55 driven by the worm 56 upon the spindle 49. The shaft 46 is thus driven to turn the releasing and restoring wheel 58 a revolution once each metering period. This wheel is provided with a lug 59 which engages one end of the lever 60 at the conclusion of each metering period. This lever, when thus actuated at the conclusion of each metering period, lifts the rod 61 and effects the lateral movement thereof away from the drum 11 to engage this lug with the pins 62 and 63 upon the pawl 42 and dog 44 to move them out of engagement with the wheel 43 to permit the weighted arm 42 to restore the drum 11 and the chart thereon to zero position. The lateral movement of the rod 61 which follows the operation of the lever 60 by the lug 59 is due to the sloping links 64 and 65 which are pivotally connected with the rod each at one end and are stationarily pivoted each at its other end.

Whenever the rod 61 is lifted and moved sidewise to make the coupling devices ineffective and to bring the restoring devices into action, a rod 66 is lifted therefrom to lift the stylus 13, separate the worm 19 from the worm shaft 20, and effect engagement of the worm 45 with the restoring worm shaft 46. The worm shaft 46 is reversely threaded with respect to shaft 20 and is driven at a high rate of speed to cause rapid return movement of the stylus, to which end said shaft is driven through speed increasing gearing represented at 55, 56. The shaft 46 terminates, at its left end, short of shaft 20 so that the stylus arm is not carried out of the range of engagement with the shaft 20. The rear end of the stylus arm may be arranged to slide upon a guiding rod 68 in order to confine the stylus 13 to rectilineal movements. The coupling devices 19, 20, 42 and 43 are maintained ineffective and the restoring devices 45, 46 and 47 are permitted to function during the time that the lever 60 rides upon the lug 59 whose peripheral length is short as compared with the peripheral length of the balance of the wheel 58 which has no influence upon the lever 60 and therefore permits the rod 61 to be returned to its normal position in which the coupling devices 19, 20 and 42, 43 are effective and the restoring devices 45, 46 and 47 are ineffective.

The true watts motor may also be the moving element of an integrating watt hour meter, there being indicated the initial wheel 69 of a counting train. The reactive watts motor may also be the moving element of an integrating reactive watt hour meter, there being indicated an initial wheel 70 of a counting train.

The advantages of the metering equipment of my invention will be readily appreciated by those skilled in the art. With the aid of the record produced thereby consumers operating reactive loads may be properly billed not only for the true watts consumed but also for the wattless current employed. The records, being of the composite nature described, readily show the KVA demand for all of the metering periods intervening between the meter readings; the true wattage consumed in such metering periods; the reactive wattage; and the power factors, all of the data furnished by the records enabling central stations to render charges to their customers which will be fair to and readily comprehensible by them. By means of the equipment of my invention the disadvantage of making rates corresponding with the highest demands occurring between meter readings is avoided. The charts may be filed for record and, being small, may be quickly read. It is unnecessary to read the meters at their locations, this work being done in the accounting rooms of the central stations. The charts are preferably upon small squares of paper, thus replacing rolls of paper which have been hitherto used. The charts will continue to receive the complete records irrespective of the intervals between meter readings.

There are many other characteristics and advantages which will be readily understood by those skilled in the art.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale, a reactive watts scale angular to the true watts scale, these scales having a substantially common zero point, and a power factor scale between the other two scales, the other of said marking instrument elements being adapted to effect markings upon said chart, the chart being of cylindrical curvature and turned by one motor in one direction from zero position substantially parallel with one of the first two scales and the other marking instrument element being reciprocable in a direction substantially parallel with the other of the first two scales and moved by the other motor in one direction from zero position; two coupling devices respectively individual to said motors for coupling them with the marking instrument elements driven thereby; restoring devices respectively individual to said marking instrument elements for restoring the same to zero positions; a constant speed electric motor supplied with current from the system and in operating relation to one of said restoring devices, the other restoring device being self-acting; and mechanism periodically operated by the constant speed motor for releasing the coupling devices and bringing the restoring devices into action and for establishing operating relation between the motor operated restoring device and the constant speed motor.

2. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale, a reactive watts scale, these scales having a substantially common zero point, and a power factor scale between the other two scales, the other of said marking instrument elements being adapted to effect markings upon said chart; two coupling devices respectively individual to said motors for coupling them with the marking instrument elements driven thereby; restoring devices respectively individual to said marking instrument elements for restoring the same to zero positions; a constant speed electric motor supplied with current from the system and in operating relation to one of said restoring devices, the other restoring device being self-acting; and mechanism periodically operated by the constant speed motor for releasing the coupling devices and bringing the restoring devices into action and for establishing operating relation between the motor operated restoring device and the constant speed motor.

3. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale and a reactive watts scale angular to the true watts scale, these scales having a substantially common zero point, the other of said marking instrument elements being adapted to effect markings upon said chart, the chart being of cylindrical curvature and turned by one motor in one direction from zero position substantially parallel with one of the first two scales and the other marking instrument element being reciprocable in a direction substantially parallel with the other of the first two scales and moved by the other motor in one direction from zero position; two coupling devices respectively individual to said motors for coupling them with the marking instrument elements driven thereby; restoring devices respectively individual to said marking instrument elements for restoring the same to zero positions; a constant speed electric motor supplied with current from the system and in operating relation to one of said restoring devices, the other restoring device being self-acting; and mechanism periodically operated by the constant speed motor for releasing the coupling devices and bringing the restoring devices into action and for establishing operating relation between the motor operated restoring device and the constant speed motor.

4. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale and a reactive watts scale, these scales having a substantially common zero point, the other of said marking instrument elements being adapted to effect markings upon said chart; two coupling devices respectively individual to said motors for coupling them with the marking instrument elements driven thereby; restoring devices respectively individual to said marking instrument elements for restoring the same to zero positions; a constant speed electric motor supplied with current from the system and in operating relation to one of said restoring devices, the other restoring device being self-acting; and mechanism periodically operated by the constant speed motor for releasing the coupling devices and bringing the restoring devices into action and for establishing operating relation between the motor operated restoring device and the constant speed motor.

5. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one adapted to mark the other, one rotative and turned by one motor in one direction from zero position, and the other reciprocable and moved by the other motor in one direction from zero position; two coupling devices respectively individual to said motors for coupling them with the marking instrument elements driven thereby; restoring devices respectively individual to said marking instrument elements for restoring the same to zero positions; a constant speed electric motor supplied with current from the system and in operating relation to one of said restoring devices, the other restoring device being self-acting; and mechanism periodically operated by the constant speed motor for releasing the coupling devices and bringing the restoring devices into action and for establishing operating relation between the motor operated restoring device and the constant speed motor.

6. In a system of alternating electric current distribution having a reactive load, the combination with an electric motor having windings subject to the current and pressure of the system and arranged to cause motion proportional to the energy consumed; of a second electric motor having windings subject to current and pressure of the system and arranged to cause motion proportional to the reactive watts; a marking instrument having two complemental moving elements, one adapted to mark the other, one operated by one motor in one direction from zero position and the other by the other motor in one direction from zero position; two coupling devices respectively individual to said motors for coupling them with the marking instrument elements driven thereby; restoring devices respectively individual to said marking instrument elements for restoring the same to zero positions; a constant speed electric motor supplied with current from the system and in operating relation to one of said restoring devices, the other restoring device being self-acting; and mechanism periodically operated by the constant speed motor for releasing the coupling devices and bringing the restoring devices into action and for establishing operating relation between the motor operated restoring device and the constant speed motor.

7. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale, a reactive watts scale angular to the true watts scale, these scales having a substantially common zero point, and a power factor scale between the other two scales, the other of said marking instrument elements being adapted to effect markings upon said chart, the chart being of cylindrical curvature and turned by one motor in one direction from zero position substantially parallel with one of the first two scales and the other marking instrument element being adapted to mark the first and reciprocable in a direction substantially parallel with the other of the first two scales and moved by the other motor in one direction from zero position; two coupling devices respectively individual to said motors for coupling them with the marking instrument elements driven thereby; restoring devices respectively individual to said marking instrument elements for restoring the same to zero positions; a restoring motor; and mechanism periodically operated by the restoring motor for releasing the coupling devices and bringing the restoring devices into action.

8. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale, a reactive watts scale, these scales having a substantially common zero point, and a power factor scale between the other two scales, the other of said marking instrument elements being adapted to effect markings upon said chart; two coupling devices respectively individual to said motors for coupling them with the marking instrument elements driven thereby; restoring devices respectively individual to said marking instrument elements for restoring the same to zero positions, a restoring motor; and mechanism periodically operated by the restoring motor for releasing the coupling devices and bringing the restoring devices into action.

9. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale and a reactive watts scale angular to the true watts scale, these scales having a substantially common zero point, the other of said marking instrument elements being adapted to effect markings upon said chart, the chart being of cylindrical curvature and turned by one motor in one direction from zero position substantially parallel with one of the first two scales and the other marking instrument element being reciprocable in a direction substantially parallel with the other of the first two scales and moved by the other motor in one direction from zero position; two coupling devices respectively individual to said motors for coupling them with the marking instrument elements driven thereby; restoring devices respectively individual to said marking instrument elements for restoring the same to zero positions; a restoring motor; and mechanism periodically operated by the restoring motor for releasing the coupling devices and bringing the restoring devices into action.

10. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale and a reactive watts scale, these scales having a substantially common zero point, the other of said marking instrument elements being adapted to effect markings upon said chart; two coupling devices respectively individual to said motors for coupling them with the marking instrument elements driven thereby; restoring devices respectively individual to said marking instrument elements for restoring the same to zero positions; a restoring motor; and mechanism periodically operated by the restoring motor for releasing the coupling devices and bringing the restoring devices into action.

11. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one adapted to mark the other, one rotative and turned by one motor in one direction from zero position, and the other reciprocable and moved by the other motor in one direction from zero position; two coupling devices respectively individual to said motors for coupling them with the marking instrument elements driven thereby; restoring devices respectively individual to said marking instrument elements for restoring the same to zero positions; a restoring motor; and mechanism periodically operated by the restoring motor for releasing the coupling devices and bringing the restoring devices into action.

12. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one adapted to mark the other, one operated by one motor in one direction from zero position and the other by the other motor in one direction from zero position; two coupling devices respectively individual to said motors for coupling them with the marking instrument elements driven thereby; restoring devices respectively individual to said marking instrument elements for restoring the same to zero positions; a restoring motor; and mechanism periodically operated by the restoring motor for releasing the coupling devices and bringing the restoring devices into action.

13. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one adapted to mark the other, one in the form of a chart provided with a true watts scale, a reactive watts scale angular to the true watts scale, these scales having a substantially common zero point, and a power factor scale between the other two scales, the other of said marking instrument elements being adapted to effect markings upon said chart, the chart being of cylindrical curvature and turned by one motor in one direction from zero position substantially parallel with one of the first two scales and the other marking instrument element being reciprocable in a direction substantially parallel with the other of the first two scales and moved by the other motor in one direction from zero position; two coupling devices respectively individual to said motors for coupling them with the marking instrument elements driven thereby; and mechanism for periodically restoring the complemental elements of the marking instrument to zero positions.

14. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale, a reactive watts scale, these scales having a substantially common zero point, and a power factor scale between the other two scales, the other of said marking instrument elements being adapted to effect markings upon said chart; two coupling devices respectively individual to said motors for coupling them with the marking instrument elements driven thereby; and mechanism for periodically restoring the complemental elements of the marking instrument to zero positions.

15. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale and a reactive watts scale angular to the true watts scale, these scales having a substantially common zero point, the other of said marking instrument elements being adapted to effect markings upon said chart, the chart being of cylindrical curvature and turned by one motor in one direction from zero position substantially parallel with one of the first two scales and the other marking instrument element being reciprocable in a direction substantially parallel with the other of the first two scales and moved by the other motor in one direction from zero position; two coupling devices respectively individual to said motors for coupling them with the marking instrument elements driven thereby; and mechanism for periodically restoring the complemental elements of the marking instrument to zero positions.

16. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale and a reactive watts scale, these scales having a substantially common zero point, the other of said marking instrument elements being adapted to effect markings upon said chart; two coupling devices respectively individual to said motors for coupling them with the marking instrument elements driven thereby; and mechanism for periodically restoring the complemental elements of the marking instrument to zero positions.

17. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one adapted to mark the other, one rotative and turned by one motor in one direction from zero position, and the other reciprocable and moved by the other motor in one direction from zero position; two coupling devices respectively individual to said motors for coupling them with the marking instrument elements driven thereby; and mechanism for periodically restoring the complemental elements of the marking instrument to zero positions.

18. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale, the reactive watts scale angular to the true watts scale, these scales having a substantially common zero point, and a power factor scale between the other two scales, the other of said marking instrument elements being adapted to effect markings upon said chart, the chart being of cylindrical curvature and turned by one motor substantially parallel with one of the first two scales and the other marking instrument element being movable by the other motor in a direction substantially parallel with the other of the first two scales; and mechanism for periodically restoring said complemental elements to zero positions.

19. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one adapted to mark the other, one in the form of a chart provided with a true watts scale, a reactive watts scale, these scales having a substantially common zero point, and a power factor scale between the other two scales, the other of said marking instrument elements being adapted to effect markings upon said chart; and mechanism for periodically restoring said complemental elements to zero positions.

20. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale and a reactive watts scale angular to the true watts scale, these scales having a substantially common zero point, the other of said marking instrument elements being adapted to effect markings upon said chart, the chart being of cylindrical curvature and turned by one motor substantially parallel with one of the first two scales and the other marking instrument element being movable by the other motor in a direction substantially parallel with the other of the first two scales; and mechanism for periodically restoring said complemental elements to zero positions.

21. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a marking instrument having two complemental moving elements, one in the form of a chart provided with a true watts scale and a reactive watts scale, these scales having a substantially common zero point, the other of said marking instrument elements being adapted to effect markings upon said chart; and mechanism for periodically restoring said complemental elements to zero positions.

22. In a system of alternating electric current distribution having a reactive load, the combination with an electric motor having windings subject to current and pressure of the system and arranged to cause motion proportional to the energy consumed; of a second electric motor having windings energy consumed; of a second electric motor having windings subjects to current and pressure of the system and arranged to cause motion proportional to the reactive watts; a recording instrument having two complemental moving elements, one adapted to mark the other, one in the form of a chart and operated by one motor in one direction from zero position and the other in the form of a marker operating upon the chart and operated by the other motor in one direction from zero position; two coupling devices respectively individual to said motors for coupling them with the recording instrument elements driven thereby; restoring devices respectively individual to said recording instrument elements for restoring the same to zero positions; a constant speed electric motor supplied with current from the system and in operating relation to one of said restoring devices, the other restoring device being self-acting; and mechanism periodically operated by the constant speed motor for releasing the coupling devices and bringing the restoring devices into action and for establishing operating relation between the motor operated restoring device and the constant speed motor.

23. In a system of alternating electric current distribution having a reactive load, the combination with an electric motor having windings subject to current and pressure of the system and arranged to cause motion proportional to the energy consumed; of a second electric motor having windings subject to current and pressure of the system and arranged to cause motion proportional to the reactive watts; a recording instrument having two complemental moving elements, one adapted to mark the other, one in the form of a chart and operated by one motor in one direction from zero position and the other in the form of a marker operating upon the chart and operated by the other motor in one direction from zero position; two coupling devices respectively individual to said motors for coupling them with the recording instrument elements driven thereby; restoring devices respectively individual to said recording instrument elements for restoring the same to zero positions; a restoring motor; and mechanism periodically operated by the restoring motor for releasing the coupling devices and bringing the restoring devices into action.

In witness whereof, I hereunto subscribe my name this 13th day of May A. D., 1922.

JESSE HARRIS.